United States Patent
Hung

(10) Patent No.: US 9,852,556 B2
(45) Date of Patent: Dec. 26, 2017

(54) DYNAMIC ENTRANCE CONTROLLING SYSTEM AND DYNAMIC ENTRANCE CONTROLLING METHOD

(71) Applicant: CAL-COMP ELECTRONICS & COMMUNICATIONS COMPANY LIMITED, New Taipei (TW)

(72) Inventor: Pei-Jiun Hung, New Taipei (TW)

(73) Assignee: CAL-COMP ELECTRONICS & COMMUNICATIONS COMPANY LIMITED, New Taipei (TW)

( * ) Notice: Subject to any disclaimer, the term of this patent is extended or adjusted under 35 U.S.C. 154(b) by 0 days.

(21) Appl. No.: 15/177,141

(22) Filed: Jun. 8, 2016

(65) Prior Publication Data
US 2017/0301163 A1    Oct. 19, 2017

(30) Foreign Application Priority Data
Apr. 15, 2016    (TW) .............................. 105111760 A

(51) Int. Cl.
G05B 19/00    (2006.01)
G07C 9/00    (2006.01)
(Continued)

(52) U.S. Cl.
CPC ...... *G07C 9/00111* (2013.01); *G06K 9/00288* (2013.01); *G06K 9/6201* (2013.01);
(Continued)

(58) Field of Classification Search
CPC ................................................ G06K 9/00288
(Continued)

(56) References Cited

U.S. PATENT DOCUMENTS

2004/0160318 A1*  8/2004  Sasaki ................... G01S 13/04
                                                            340/522
2005/0110610 A1    5/2005  Bazakos et al.
(Continued)

FOREIGN PATENT DOCUMENTS

CN    102982586 A    3/2013
CN    204347946 U    5/2015
(Continued)

OTHER PUBLICATIONS

Office Action dated Dec. 22, 2016 of the corresponding Taiwan patent application.
(Continued)

*Primary Examiner* — Omeed Alizada
(74) *Attorney, Agent, or Firm* — Chun-Ming Shih; HDLS IPR Services

(57) ABSTRACT

A dynamic entrance controlling system (1) includes two wireless signal receiving devices (11), an image capturing device (12) and a host (13). The two wireless signal receiving devices (11) respectively sense a target (2) entering a restrained area and obtain an ID information (ID1) of the target (2), and the host (13) determines a moving direction of the target (2) according to the order of the two wireless signal receiving devices (11) of obtaining the ID information (ID1). If the moving direction matches with a certain condition, the host (13) reads internally a pre-stored image information (I1) of the target (2) according to the ID information (ID1), and triggers the image capturing device (12) to capture a real-time image information (I2) for the target (2). Next, the host (13) compares the two image information (I1, I2) in order to recognize an identity of the target (2).

19 Claims, 9 Drawing Sheets

(51) Int. Cl.
   *G06K 9/00* (2006.01)
   *G06K 9/62* (2006.01)
   *H04N 5/44* (2011.01)
   *H04W 4/00* (2009.01)
   *H04W 4/02* (2009.01)

(52) U.S. Cl.
   CPC ........... *G07C 9/00087* (2013.01); *H04N 5/44* (2013.01); *H04W 4/008* (2013.01); *H04W 4/028* (2013.01)

(58) Field of Classification Search
   USPC ....................................................... 340/5.61
   See application file for complete search history.

(56) References Cited

U.S. PATENT DOCUMENTS

| | | | |
|---|---|---|---|
| 2009/0153333 A1 | 6/2009 | Zhang et al. | |
| 2013/0063581 A1* | 3/2013 | Komatsu | G06K 9/00926 348/77 |
| 2014/0049361 A1 | 2/2014 | Ahearn et al. | |
| 2016/0048721 A1* | 2/2016 | Harper | G06K 9/00771 382/103 |

FOREIGN PATENT DOCUMENTS

| | | |
|---|---|---|
| CN | 105139046 A | 12/2015 |
| CN | 105303654 A | 2/2016 |
| TW | M459466 U | 8/2013 |
| TW | 201411495 A | 3/2014 |
| TW | M482119 U | 7/2014 |

OTHER PUBLICATIONS

Office Action dated Sep. 2, 2016 of the corresponding Taiwan patent application.

Search Report dated Sep. 7, 2017 of the corresponding European patent application.

* cited by examiner

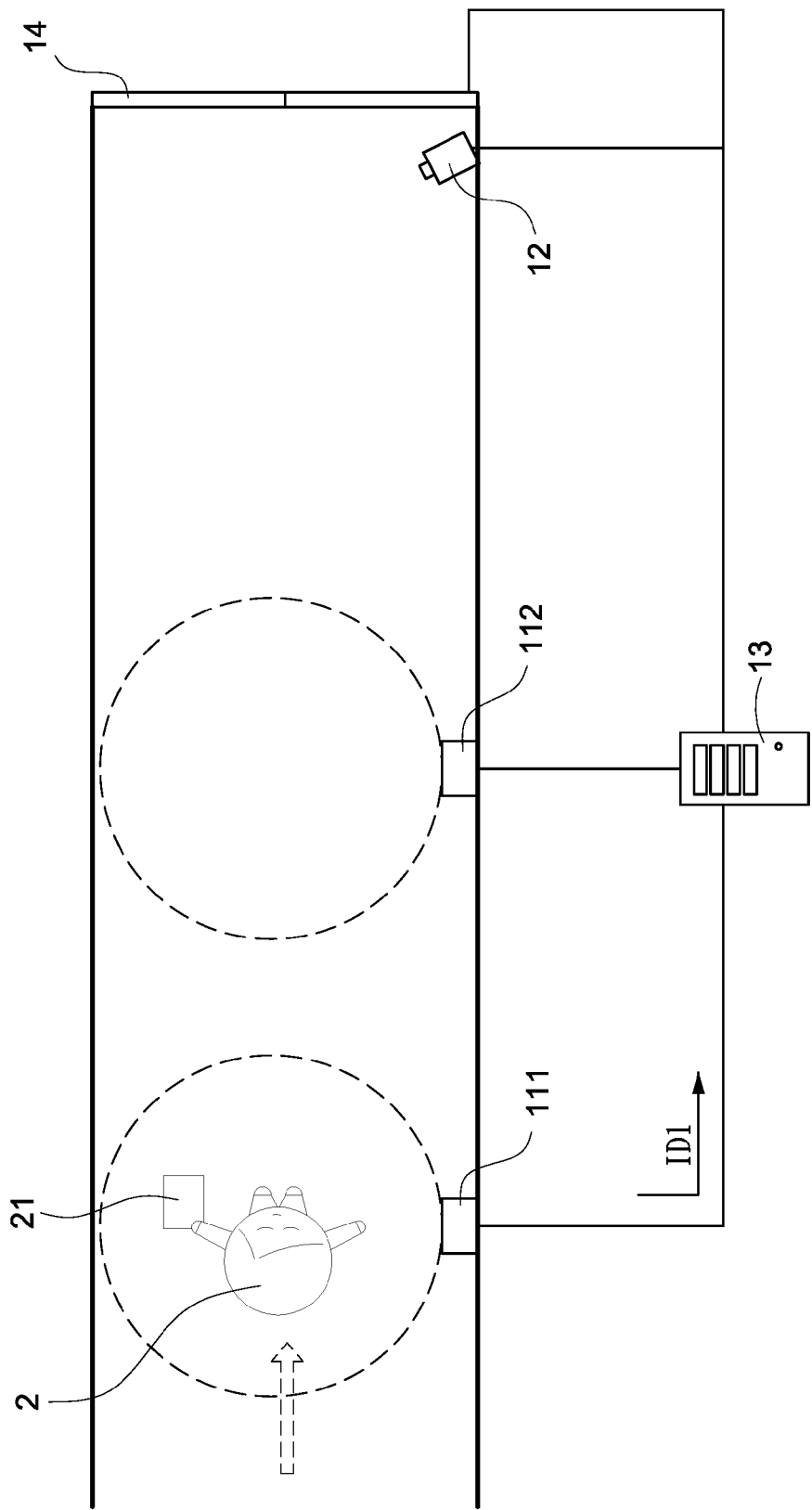

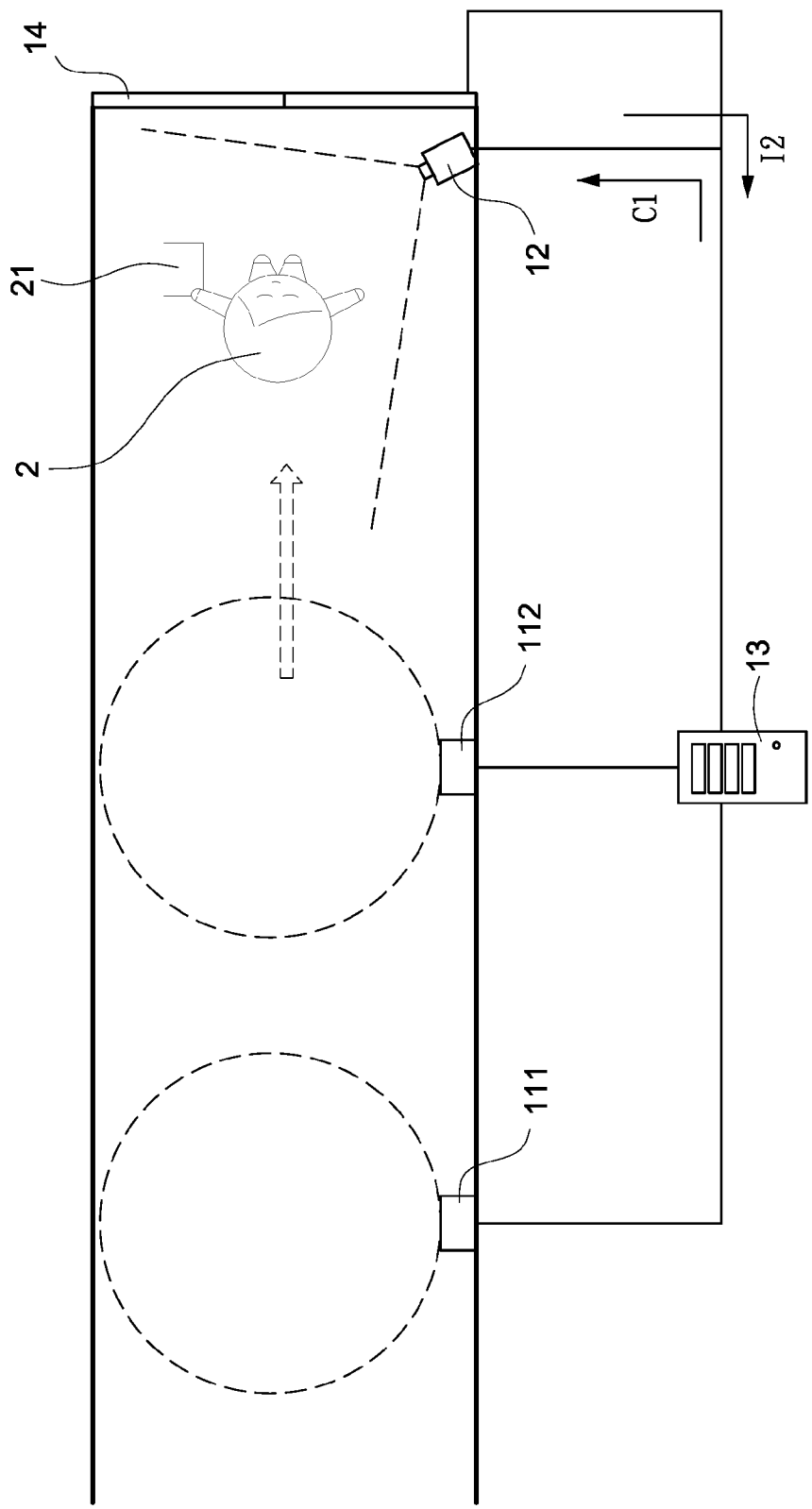

DYNAMIC ENTRANCE CONTROLLING SYSTEM AND DYNAMIC ENTRANCE CONTROLLING METHOD

BACKGROUND OF THE INVENTION

Technical Field

The invention is related to an entrance controlling system and an entrance controlling method, in particular to a dynamic entrance controlling system and a dynamic entrance controlling method thereof.

Description of Prior Art

It has been the main purpose of how to effectively and accurately know the access condition of people for all the entrance controlling systems. Conventional entrance controlling systems mainly adopt wireless sensing techniques which sense entrance guard cards brought with people via wireless card reader set at the entrance, and allow people to pass through when the read information on the entrance guard card is correct. However, there is a problem in which the entrance guard cards may easily get lost, causing the risk on safety. Besides, people may give entrance guard cards to others to conduct substituted swiping. The system cannot make sure the man who conducts swiping is the man who owns the card, so that the person controls cannot be carried on exactly.

In recent years, the biometric techniques are more and more popular. Part of the entrance controlling systems adopt biometric techniques (such as the fingerprint identification), expecting to increase accuracy of identifications and enhance the safety. Furthermore, the biometrics approach avoids problems of losing entrance guard cards and encountering substituted swiping mentioned above.

However, biometric techniques will essentially bring different problems. Taking the fingerprint identification as an example, if the fingerprint identification is conducted, people should be in static states. After a few seconds with a finger attached on the fingerprint sensor, the fingerprint information of the person can thus be read and the identity been recognized, so as to decide whether to allow the person to pass through or not. However, the time needed for the fingerprint identification is longer. If this kind of identification way is adopted, it will cause the problem of people stuck in line during the rush hours like commuting time, thus making the mobility of people in restrained areas been impeded.

SUMMARY OF THE INVENTION

The main purpose of the invention is to provide a dynamic entrance controlling system and a dynamic entrance controlling method, enabling the conduction of identity recognition one to one directly to the target in the state of normal moving of the target, so as to enhance the smoothness of the mobility of people.

Another purpose of the invention is to provide a dynamic entrance controlling system and a dynamic entrance controlling method which can determine the moving direction of the target according to two wireless receiving devices sensing the order of signals, so as to determine whether it is necessary to conduct identification to the target or not to reduce the load of working of the system.

In order to achieve the purpose mentioned above, the dynamic entrance controlling system of the invention comprises two wireless signal receiving devices, an image capturing device, and a host. The two wireless signal receiving devices respectively sense a target entering a restrained area and obtain the ID information of the target. The host determines the moving direction of the target according to the order of the two wireless signal receiving devices of obtaining the ID information.

When the moving direction matches with a certain condition been determined, the host reads internally pre-stored image information of the target according to the ID information, and triggers the image capturing device to capture real-time image information for the target. The host next compares the pre-stored image information and the real-time image information to conduct identity recognition for the target, and allows for the target to pass through after a successful recognition.

Compared with conventional techniques, the technical efficiencies of the invention is to conduct sensing to the target in order by the sequential two wireless signal receiving devices. The moving direction of the target (such as entering the door or exiting the door) can be determined according to the time difference of the obtained signals, so as to determine whether to conduct identity recognition to the target or not. Therefore, the host does not need to conduct identity recognitions to every target entering the restrained area, so as to effectively reduce the load of working of the system.

Furthermore, the invention first obtains the ID information of the target via sensing by the two wireless signal receiving devices, and then reads pre-stored image information corresponding to the target according to the ID information. When the host is conducting the identity recognitions, the host conducts an identity recognition one to one to the target according to the pre-stored image information Therefore, it not only can enhance the recognition efficiency and reduce the recognition time, but also can directly complete the identity recognition in the state of normal moving of the target, so as to effectively enhance the smoothness of the mobility of people, which is quite convenient.

BRIEF DESCRIPTION OF THE DRAWINGS

FIG. 6A is a first moving action schematic diagram of the first embodiment of the invention.

FIG. 6C is a third moving action schematic diagram of the first embodiment of the invention.

DETAILED DESCRIPTION OF REPRESENTATIVE EMBODIMENTS

A preferred embodiment with drawings will be illustrated in details later.

Figure 1:
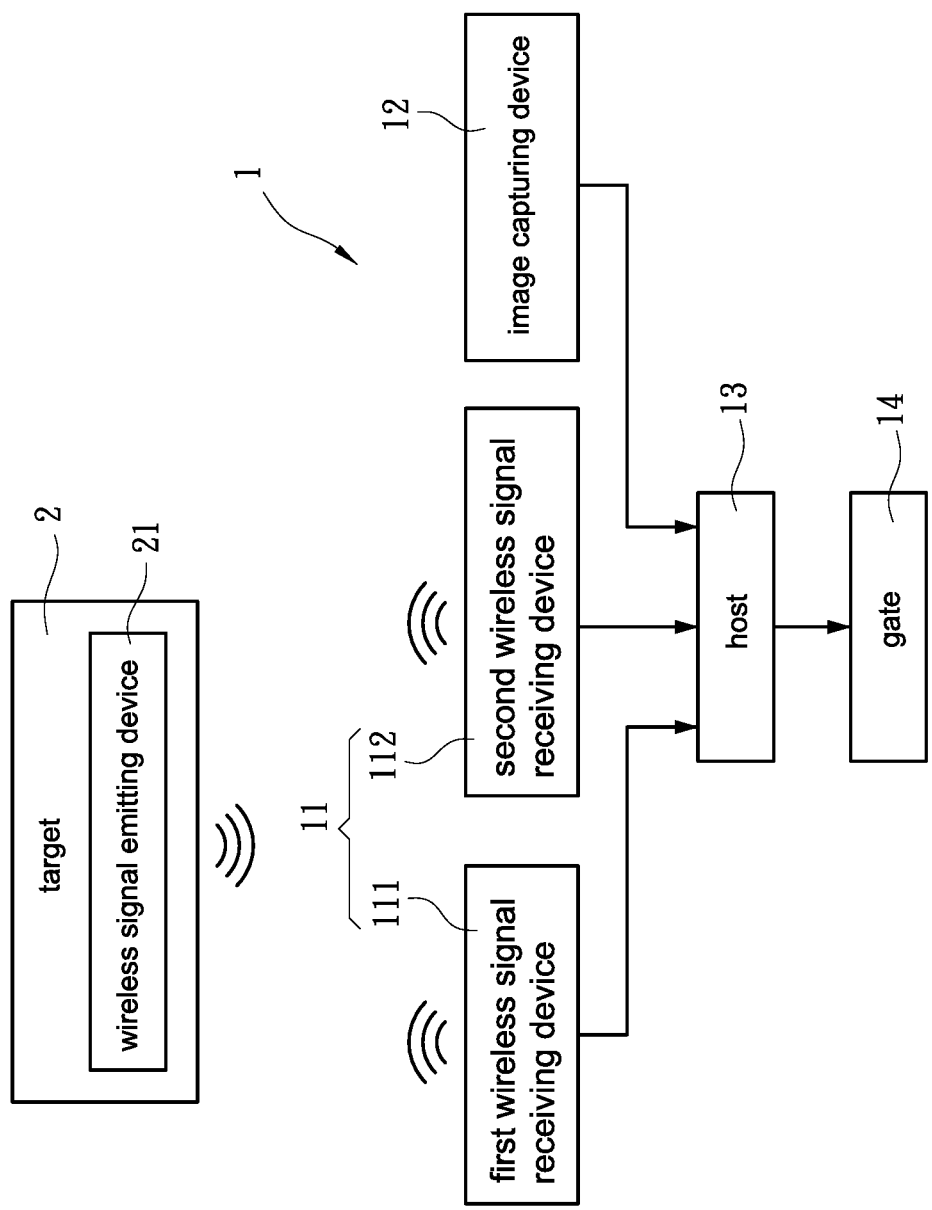
FIG. 1 is a system block diagram of the first embodiment of the invention.

Refer to FIG. 1. FIG. 1 is a system block diagram of the first embodiment of the invention. As shown in FIG. 1, the invention discloses a dynamic entrance controlling system 1

(system 1 as abbreviation in the following). In one embodiment of the invention, the system 1 mainly includes two wireless signal receiving devices 11, an image capturing device 12, and a host 13, wherein the host 13 electrically connected to the two wireless signal receiving devices 11 and the image capturing device 12. The image capturing device 12 can be a camera for example.

In the invention, the system 1 is mainly set in a restrained area and sensing a target 2 entering the restrained area via the two wireless signal receiving devices 11. Specifically, the two wireless receiving devices 11 is to sense wirelessly a wireless signal emitting device 21 on the target 2, so as to obtain an ID information (the ID information ID1 as shown in FIG. 6A) recorded in the wireless signal emitting device 21, wherein the ID information ID1 is directly related to the target 2.

In this embodiment, the restrained area can be set in the company, each department, or the entrance of a conference room for example. The target 2 can be a staff for example. The wireless signal emitting device 21 can be an employee's card brought with a staff and with wireless communication function on it, or an employee's card with built-in passive wireless label, and the ID information ID1 can be a name, staff serial numbers, social security numbers or other serial numbers having uniqueness of the target 2 for example, which is not restricted herein.

In another embodiment, the restrained area can be an unloading area for example. The target 2 can be a truck for example. The wireless signal emitting device 21 can be a parking permit set on the truck having wireless communication function or a built-in passive wireless label for example. The ID information ID1 can be the license plate number of the target 2, the serial number of the car, or the name of the driver for example, which is not restricted herein.

It is worth mentioning that, in the invention the two wireless signal receiving devices 11 mainly can conduct a wireless sensing to the wireless signal emitting device 21 by one of the wireless communication techniques: Wireless Fidelity (Wi-Fi), Worldwide Interoperability for Microwave Access (WiMAX), Bluetooth, Near Field Communication (NFC), High Performance Radio Metropolitan Area Network (HiperMAN), Infrared (IR), Zigbee, Radio Frequency (RF), Wireless Universal Serial Bus (Wireless USB), or Ultra-wideband (UWB), etc. Things mentioned above are only embodiments of the invention and should not be limited herein.

The two wireless signal receiving devices 11 mainly include a first wireless signal receiving device 111 and a second wireless signal receiving device 112. When the target 2 enters the sensing range of the first wireless signal receiving device 111 at a first time point, the first wireless signal receiving device 111 can sense the wireless signal emitting device 21 at the first time point and obtains the ID information ID1. When the target 2 enters the sensing range of the second wireless signal receiving device 112 at a second time point, the second wireless signal receiving device 112 can sense the wireless signal emitting device 21 at the second time point and obtains the ID information ID1.

In the invention, there is a threshold distance between the first wireless signal receiving device 111 and the second wireless signal receiving device 112, such that there been no overlap between the sensing range of the first wireless signal receiving device 111 and the sensing range of the second wireless receiving device 112. The host 13 can determine the moving direction of the target 2 via the time difference between the first time point and the second time point, so as to decide whether to conduct an identity recognition to the target 2 or not.

Specifically, the system 1 further includes a gate 14 electrically connected to the host 13. In this embodiment, the first wireless signal receiving device 111 is set at the position away from the gate 14, and the second wireless signal receiving device 112 is set at the position close to the gate 14 (as shown in the embodiment of FIG. 6A). In this embodiment, the two wireless signal receiving devices 11 can be set at anywhere in the restrained area, such as on the ceilings, walls, or grounds, and should not be limited herein.

If the second time point mentioned above is later than the first time point (that is, the target 2 first enters the sensing range of the first wireless signal receiving device 111, and then enters the sensing range of the second wireless signal receiving device 112). The host 13 can determine the moving direction of the target 2 as entering the door (that is, moving forward to the direction of the gate 14). In this condition, the host 13 needs to further conduct identity recognition to the target 2, so as to decide whether to open the gate 14 and allow the target 2 to enter in.

On the contrary, if the first time point is later than the second time point (that is, the target 2 first enters the sensing range of the second wireless signal receiving device 112, and then enters the sensing range of the first wireless signal receiving device 111), then the host 13 determines the moving direction of the target 2 as exiting the door (that is, moving forward to the direction opposite to the gate 14). In this condition, the host 13 does not conduct identity recognition to the target 2. Through the determination of the moving direction, the host 13 needs not to conduct identity recognitions to every target 2 entering the restrained region, thus the load of working of the system 1 can be effectively reduced.

Figure 2:
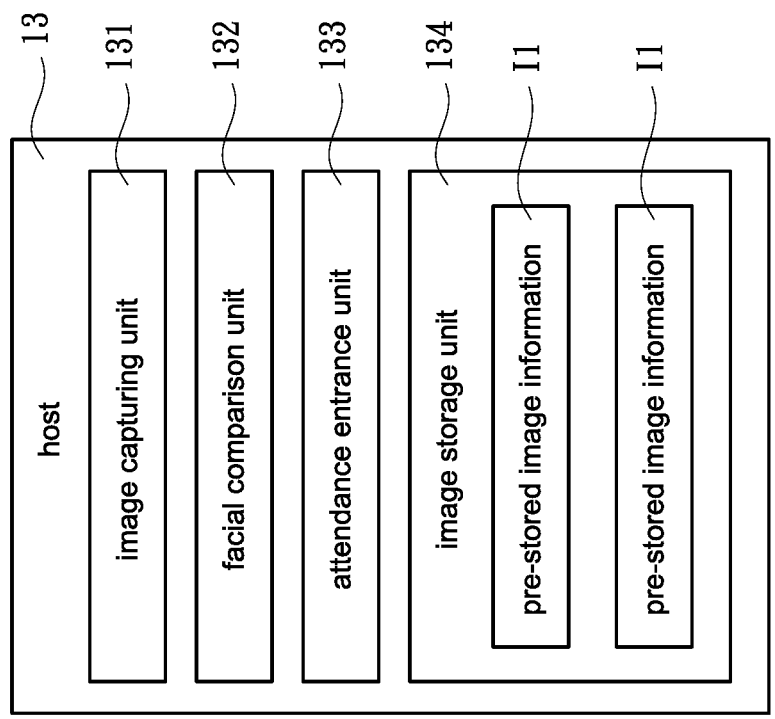
FIG. 2 is a host block diagram of the first embodiment of the invention.

As was mentioned above, when the second time point later than the first time point is been determined, the host 13 immediately reads a pre-stored image information (the pre-stored image information I1 as shown in FIG. 2) of the target 2 from interior according to the sensed ID information ID1. The image capturing device 12 is simultaneously triggered to immediately capture a real-time image information of the target 2 (the real-time image information I2 as shown in FIG. 6C). Next, the host 13 conducts a comparison between the pre-stored image information I1 and the real-time image information I2 to conduct an action of identity recognition on the target 2.

It is worth mentioning that, the pre-stored image information I1 is an image of the target 2 obtained in advance and stored by the system 1 via the image capturing device 12 or other ways. Specifically, the pre-stored image information I1 and the real-time image information I2 can be the facial image of the target 2, and the identity recognition action can be a facial recognition, but should not be limited herein.

The invention first determines the moving direction of the target 2 via the two wireless signal receiving devices 11 set at different positions, and when the moving direction of the target 2 matches with a condition (such as entering the door), obtaining the pre-stored image information I1 and the real-time image information I2 directly related to the target 2 to conduct the comparison. Since the identity recognition action conducted by the system 1 is one to one, the recognition efficiency is higher and the working burden is smaller. As a result, the system 1 actually can conduct the identity recognition directly to the target 2 under a normal moving state of the target 2. As a result, the recognition accuracy can be enhanced (due to the adoption of one to one recognition way) in the premise of not influencing the smoothness of mobility of people (since the identity recognition of the target 2 can be conducted without stopping moving).

Refer to FIG. 2 simultaneously. FIG. 2 is a host block diagram of the first embodiment of the invention. As shown in FIG. 2, in this embodiment, the host 13 mainly includes an image capturing unit 131, a facial comparison unit 132, an attendance entrance unit 133, and an image storage unit 134.

Specifically, the image storage unit 134 is used to store the pre-stored image information I1 of the target 2 which have been captured in advance. In this embodiment, the numbers of pre-stored image information I1 are the same as the number of the targets 2 using the system 1. In other words, if the system 1 applies to one hundred people (such as a total of one hundred staffs), then the image storage unit 134 need to store at least one hundred the pre-stored image information I1, and each of the pre-stored image information I1 corresponds respectively to the targets 2 with different identities.

After the two wireless signal receiving devices 11 all receive the same ID information ID1, the image capturing unit 131 reads the corresponding pre-stored image information I1 from the image storage unit 134 according to the ID information ID1. It is worth mentioning that, in this embodiment, only when the image capturing unit 131 first obtaining the ID information ID1 from the first wireless signal receiving device 111, and then obtaining the ID information ID from the second wireless signal receiving device 112 (that is, the moving direction of the target 2 is entering the door), the image capturing unit 131 will read the image storage unit 134 in order to obtain the pre-stored image information I1 of the target 2. Thus, the amount of computation of the host 13 can be reduced, but should not be limited herein.

The facial comparison unit 132 obtains the pre-stored image information I1 from the image capturing unit 131, obtains the real-time image information I2 from the image capturing device 12, and conducts a comparison between the pre-stored image information I1 and the real-time image information I2 to conduct the identity recognition of the target 2.

The host 13 connects the gate 14 via the attendance entrance unit 133, and the attendance entrance unit 133 controls the gate 14 to open after the identity recognition on the targets is success. It is worth mentioning that, the attendance entrance unit 133 records the ID information ID1 of the target 2, the first time point, the second time point, and the moving direction of the target 2 when the target 2 needs not conducting an identity recognition (that is, the moving direction of the target 2 is exiting the door). After conducting the identity recognition on the target 2 (that is, the moving direction of the target 2 is entering the door), the host 13 records the ID information ID1, the first time point, the second time point, the moving direction of the target 2 and the result of the identity recognition of the target 2. Wherein the result of the identity recognition can include a comparative similarity and a comparative result for examples, but not been limited herein.

Specifically, the attendance entrance unit 133 can record the information mentioned above in a control form. The control form can be shown as following for example.

|   | ID INFORMATION | FIRST TIME POINT | SECOND TIME POINT | MOVING DIERECTION | COMPARATIVE SIMILARITY | COMPARATIVE RESULT |
|---|---|---|---|---|---|---|
| 1 | A01 | 20160430090005 | 20160431090007 | ENTERING THE DOOR | 0.99 | CORRECT |
| 2 | A02 | 20160430100515 | 20160431100520 | ENTERING THE DOOR | 0.10 | FAULSE |
| 3 | A03 | 20160501121003 | 20160501121000 | EXITING THE DOOR | | |

Control Form

As shown in the above mentioned control form, the ID information ID1 of a first target is "A01". The first time point that the first wireless signal receiving device 111 sensed the first target is AM.09:00:05, April 30, 2016, and the second time point that the second wireless signal receiving device 112 sensed the first target is AM.09:00:07, April 30, 2016. Since the second time point is later than the first time point, the host 13 determines the moving direction of the first target as "entering the door", and conducts an identity recognition to the first target. In this embodiment, the comparative similarity of the first target (that is, the comparative similarity between the pre-stored image information I1 and the real-time image information I2) is 0.99, which is higher than a recognition threshold value, thus the comparative result been determined to be correct.

For another example, the ID information ID1 of a second target is "A02". The first time point that the first wireless signal receiving device 111 sensed the second target is AM.10:05:15, April 30, 2016, and the second time point that the second wireless signal receiving device 112 sensed the second target is AM.10:05:20, April 30, 2016. Since the second time point is later than the first time point, the host 13 determines the moving direction of the second target as "entering the door", and conducts an identity recognition on the second target.

However, in this embodiment, the comparative similarity of the second target is only 0.10, which is lower than the above mentioned threshold value, thus the host 13 determines the false of the comparative result. In this embodiment, the host 13 does not open the gate 14, and the entering of the second target is not allowed.

For another example, the ID information ID1 of a third target is "A03". The first time point that the first wireless signal receiving device 111 sensed the third target is AM.12:10:03, May 1, 2016, and the second time point that the second wireless signal receiving device 112 sensed the third target is AM.12:10:00, May 1, 2016. Since the first time point is later than the second time point, the host 13 determines the moving direction of the third target as "exiting the door". Thus, there is no need to conduct identity recognition to the third target, and the comparative similarity and the comparative result mentioned above are not recorded. In this embodiment, the host 13 only records the ID information ID1, the first time point, the second time point, and the moving direction of the third target.

Through the above mentioned control form, the manager of the system 1 can easily know the access status of the target 2. Furthermore, since the system 1 only conducts identity recognition to the target 2 when the wireless signal emitting device 21 is sensed by all the two wireless signal receiving devices 11 plus the second time point is later than the first time point, thus when there existing records with extremely low comparative similarity in the control form, the manager can further investigate if there is a loss or fraud swiping on the wireless signal emitting device 21 of the target 2.

Figure 3:
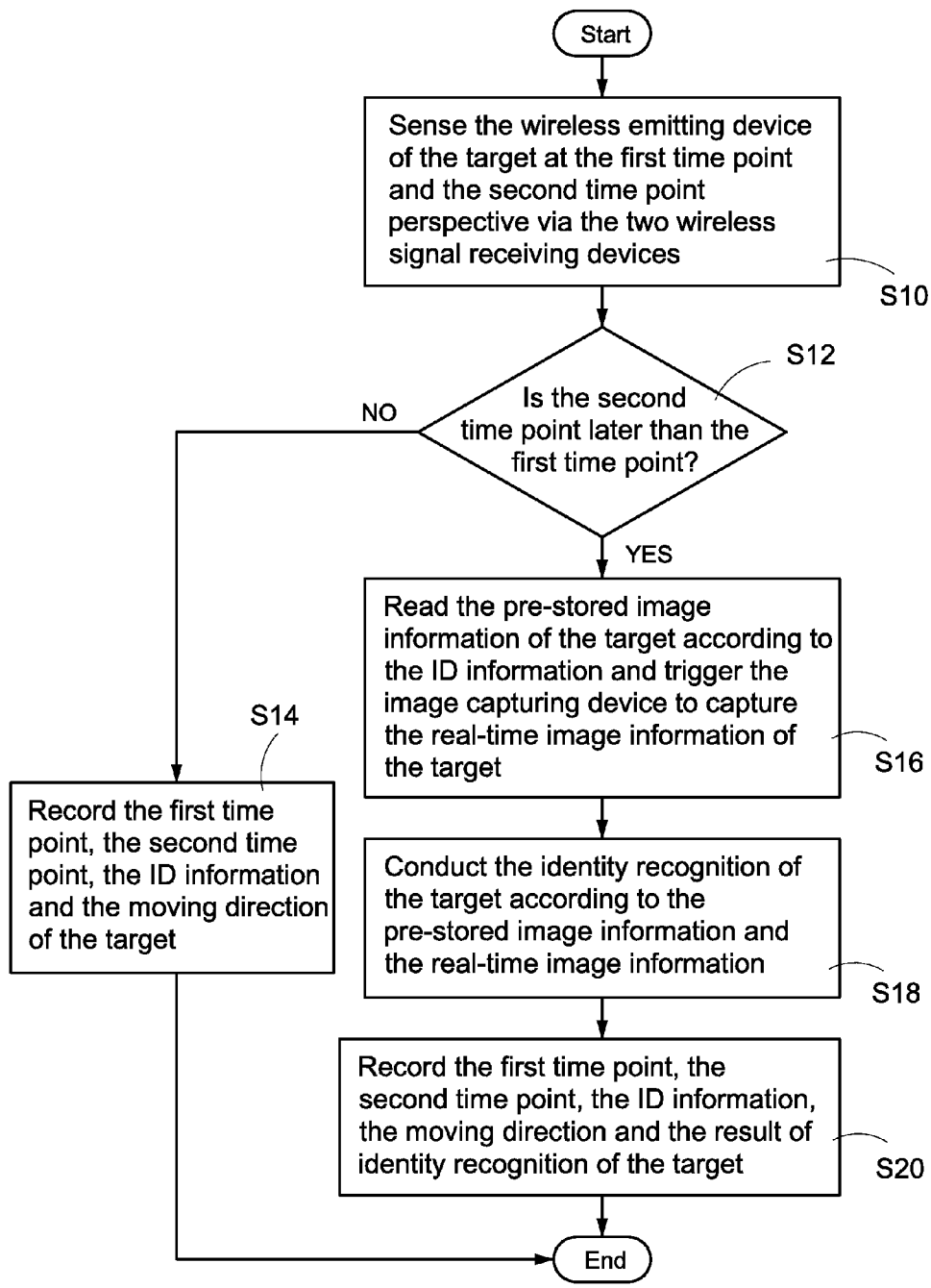
FIG. 3 is a control flow diagram of the first embodiment of the invention.

Refer to FIG. 3. FIG. 3 discloses a control flow diagram of the first embodiment of the invention. FIG. 3 discloses a dynamic entrance controlling method (the method as abbreviation in the following), wherein the method is applied to the above mentioned system 1, which including each of the following specific steps.

First, when the system 1 is started and the target 2 entering the restrained area, the two wireless signal receiving devices 11 can respectively sense the wireless signal emitting device 21 of the target 2 at the first time point and the second time point (Step S10). Next, the system 1 determines if the second time point is later than the first time point by the host 13 (Step S12).

In this embodiment, the system 1 senses wirelessly the wireless signal emitting device 21 at the first time point by the first wireless signal receiving device 111 and receives the ID information ID1, and senses wirelessly the wireless signal emitting device 21 at the second time point by the second wireless signal receiving device 112 and receiving the ID information ID1. Wherein the first wireless signal receiving device 111 is set at the position away from the gate 14, and the second wireless signal receiving device 112 is set at the position close to the gate 14. However, the aforementioned first time point, the second time point and the positions of the two wireless signal receiving devices 11 are only a specific embodiment, and should not be limited herein.

If the second time point is not later than the first time point, it means the target 2 is moving forward in the direction away from the gate 14 (the moving direction is exiting the gate). At this moment, the host 13 does not conduct identity recognition to the target 2; instead it directly records the first time point, the second time point, the ID information ID1 of the target 2 and its moving direction (Step S14).

If the second time point is actually later than the first time point, it represents the target 2 is moving toward the gate 14 (the moving direction is entering the gate). At this moment, the host 13 reads the pre-stored image information I1 corresponding to the target 2 according to the ID information ID1, and at the same time the host 13 triggers the image capturing device 12 to capture the real-time image information I2 of the target 2 (Step S16). Next, the host 13 conducts identity recognition to the target 2 according to the pre-stored image information I1 and the real-time image I2 (Step 18).

After the recognition, the host 13 records the first time point, the second time point, the ID information ID1 of the target 2, the moving direction, and the result of recognition (Step 20).

Figure 4:
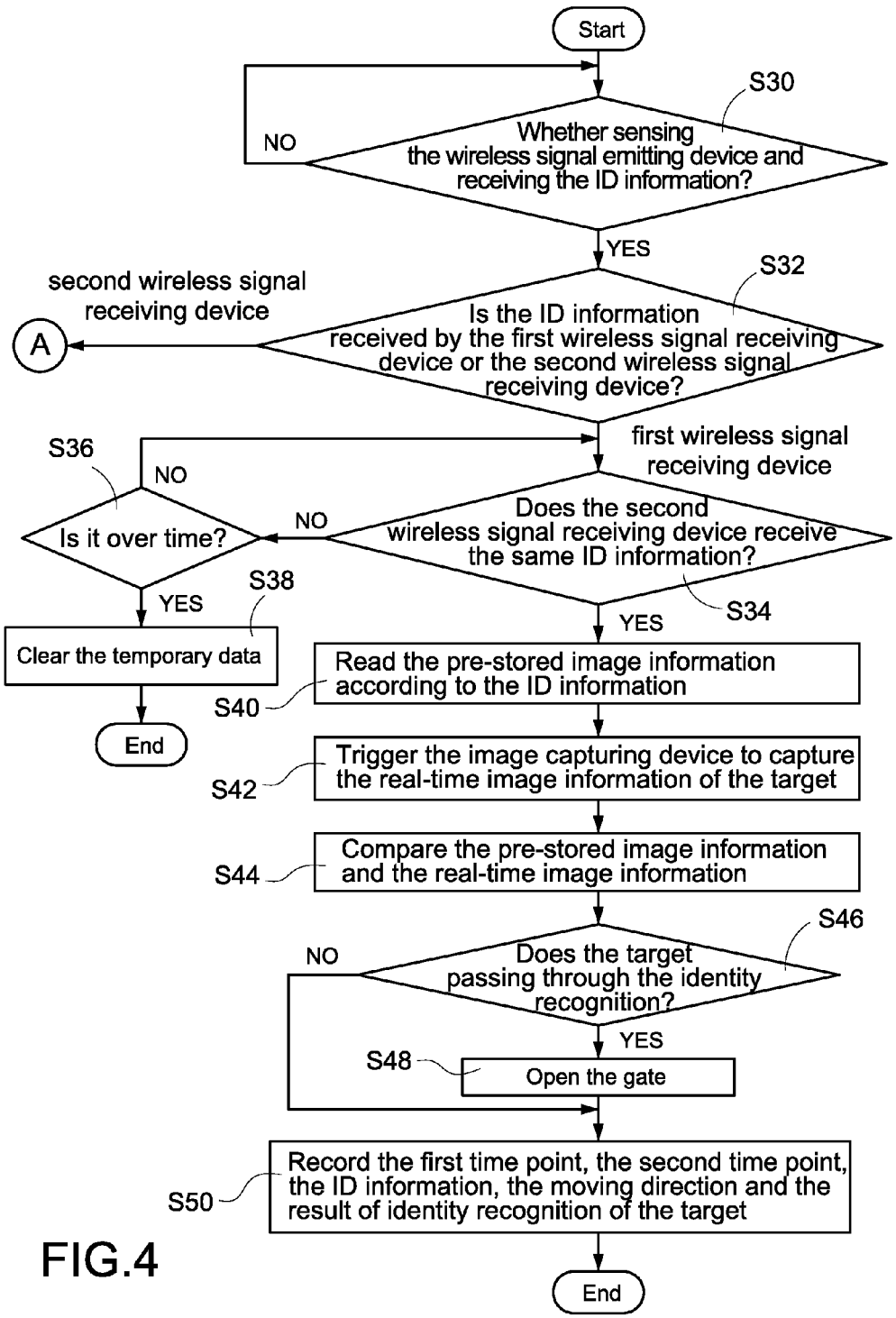
FIG. 4 is a first control flow diagram of the second embodiment of the invention.
Figure 5:
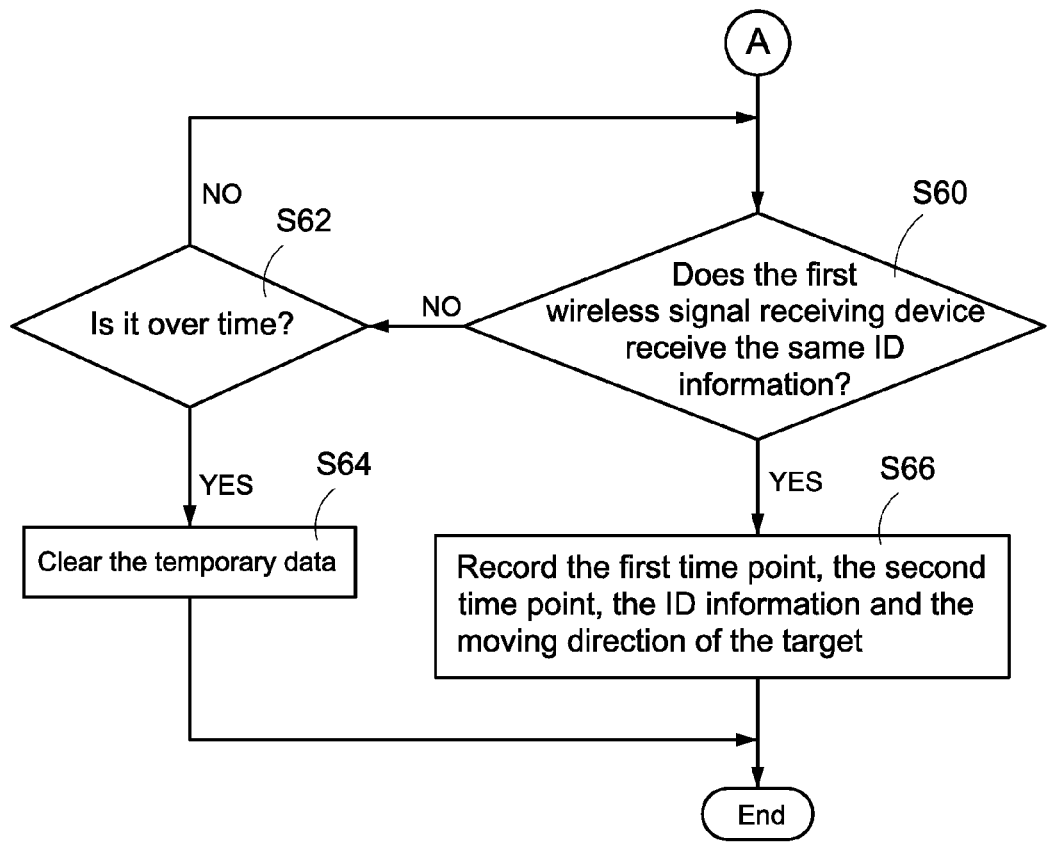
FIG. 5 is a second control flow diagram of the second embodiment of the invention.

Refer to FIG. 4 and FIG. 5 simultaneously. FIG. 4 and FIG. 5 are first control flow diagram and second control flow diagram of the second embodiment of the invention respectively. FIG. 4 and FIG. 5 illustrate the method adopted by the system 1 using different embodiments.

First, after the target 2 entering the restrained area, the host 13 determines if the wireless signal emitting device 21 is sensed and receives the ID information ID1 (Step S30), and it continues to conduct determinations before the success of sensing. More specifically, the host 13 controls the two wireless signal receiving devices 11 to continue emitting signals to the externals. When the wireless signal emitting device 21 (that is, the target 2) entering any of the sensing range of the wireless signal receiving devices 11, the host 13 receives the ID information ID1 responded by the wireless signal emitting device 21.

After the first time of receiving the ID information ID1, the host 13 determines the ID information ID1 is received by the first wireless signal receiving device 111 or the second wireless receiving device 112 (Step S32). If the ID information ID1 is received by the first wireless signal receiving device 111, the host 13 further determines if the second wireless signal receiving device 112 receives the same ID information ID1 responded by the wireless signal emitting device 21 in the following (Step S34).

The host 13 conducts waiting before the second wireless signal receiving device 112 receives the ID information ID1, and determines if the waiting is over time (Step S36). Before the waiting is over time, the host 13 continues to determine if the second wireless signal receiving device 112 receives the ID information ID1 or not. After the over time of waiting, the host 13 clears the temporary data of the first wireless signal receiving device 111 (Step S38), that is, clearing the ID information ID1 and the first time point of the ID information ID1 received by the first wireless signal receiving device 111, etc.

Specifically, if the first wireless signal receiving device 111 already senses the target 2, but the second wireless signal receiving device 112 is still not sensing the same target 2 after a threshold time, it represents the false of the first wireless signal receiving device 111, or the target 2 straying into the sensing range of the first wireless signal receiving device 111. As a result, it does not conduct further identity recognition actions to the target 2.

If the second wireless signal receiving device 112 receives the ID information ID1 before the over time (such as at the second time point), the host 13 immediately reads the pre-stored image information I1 corresponding to the target 2 according to the ID information ID1 (Step S40), and at the same time the host 13 triggers the image capturing device 12 to capture the real-time image information I2 of the target 2 (Step S42). Finally, the host 13 can conduct a comparison between the pre-stored image information I1 and the real-time image information I2 (Step S44), so as to determine if the target 2 can pass through the identity recognition (Step S46).

If the target 2 is passing through the identity recognition (that is, the comparative similarity between the pre-stored image information I1 and the real-time image information I2 is higher than a threshold value), the host 13 controls the gate 14 connected to the system 1 to open (Step S48). In this embodiment, the host 13 records simultaneously the first time point, the second time point, and the ID information ID1, the moving direction and the result of the identity recognition of the target 2 (Step S50), wherein the moving direction is entering the gate.

On the other hand, if the target 2 does not pass through the identity recognition, the host 13 will not open the gate 14. Instead, the host 13 records directly the ID information ID1 of the target 2, the first time point, the second time point, and the moving direction and the result of the identity recognition of the target 2, wherein the result of the identity recognition is failure.

As shown in FIG. 5 next, if the host 13 determines in the Step S23 that the first ID information ID1 is received by the second wireless signal receiving device 112, the host 13 further determines whether the first wireless signal receiving device 111 is next receiving the same ID information ID1 responded by the wireless signal emitting device 21 or not (Step S60). Likewise, the host 13 conducts waiting before the first wireless signal receiving device 112 receives the ID information ID1, and determines if the waiting is over time (Step S62). Before the waiting is over time, the host 13 continues to determine if the first wireless signal receiving device 111 receives the ID information ID1 or not. After the over time of waiting, the host 13 clears the temporary data of the second wireless signal receiving device 112 (Step S64). If the first wireless signal receiving device 111 receives the ID information ID1 before the over time (such as the first time point), the host 13 records the first time point, the second time point, the ID information ID1 of the target 2 and its moving direction (Step S66), wherein the moving direction is exiting the gate.

In the invention, the host 13 determines the moving direction of the target 2 as entering the gate and conducts identity recognition to the target 2 when a wireless signal receiving device away from the gate 14 senses ahead the target 2, and then a wireless signal receiving device close to the gate 14 senses the target 2 afterward. On the contrary, when the wireless signal receiving device close to the gate 14 senses ahead the target 2, and the wireless signal receiving device away from the gate 14 senses the target 2 afterward, the host 13 determines the moving direction of the target 2 is exiting the door. Also, when the moving direction of the target 2 is exiting the gate 14, the host 13 does not (and need not) conduct identity recognition on the target 2. As a result, the load of working of the system 1 during rush hours can be effectively reduced.

Figure 6B:
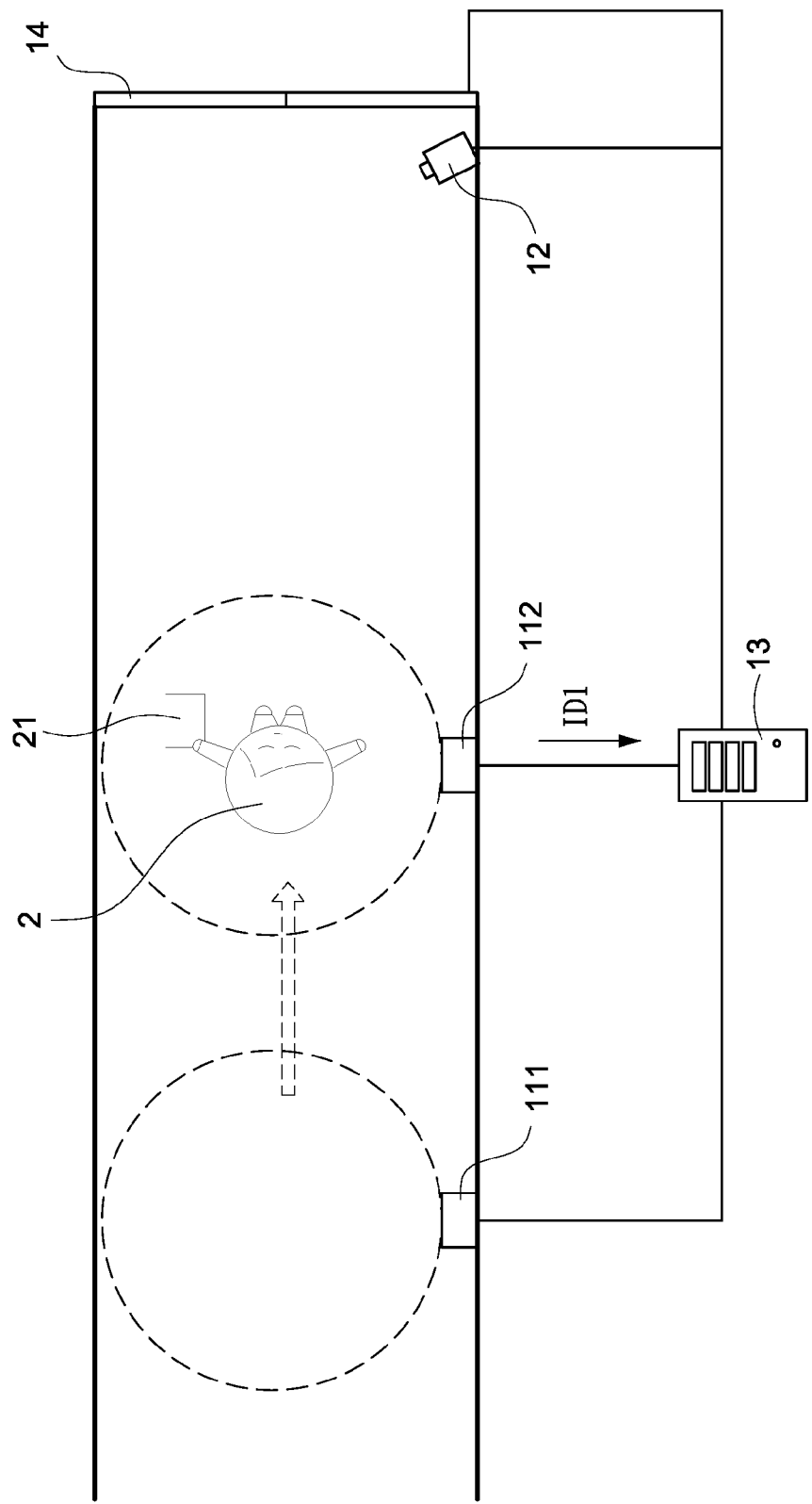
FIG. 6B is a second moving action schematic diagram of the first embodiment of the invention.

Refer to FIG. 6A to FIG. 6D. FIG. 6A to FIG. 6D are respectively first to four moving action schematic diagrams of the first embodiment of the invention. First, as shown in FIG. 6A, when the target 2 enters the sensing region of the first wireless signal receiving device 111 at the first time point, the first wireless signal receiving device 111 can sense the wireless signal emitting device 21 and receive the ID information ID1. In this embodiment, sensing regions of the first wireless signal receiving device 111 and the second wireless signal receiving device 112 do not overlap. Therefore, the second wireless signal receiving device 112 cannot sense the target 2 at this moment (that is, the first time point).

As shown in FIG. 6B next, when the target 2 continues to move and enters the sensing region of the second wireless signal receiving device 112, the second wireless signal receiving device 112 can sense the wireless signal emitting device 21 and receive the ID information ID1. Also, based on the same reason, the first wireless signal receiving device 111 cannot sense the target 2 at this moment (that is, the second time point).

As shown in FIG. 6C next, when the two wireless signal receiving devices 11 receives the ID information ID1 one after another, and when the host 13 determines the moving direction of the target 2 as entering the gate 14 according to the time difference between the first time point and the second time point, the host 13 reads the pre-stored image information I1 corresponding to the target 2 according to the ID information ID1. At the same time, the host 13 issues a first control command C1 to the image capturing device 12 to trigger the image capturing device 12 to capture the real-time image information I2 of the target 2 and to send it back to the host 13. Next, the host 13 can conduct identity recognition to the target 2 according to the pre-stored image information I1 and the real-time image information I2.

It is worth mentioning that, in the invention, the host 13 executes a one-to-one identity recognition, that is, locking on the single target 2 and only conducting recognition on the target 2. Therefore, the host 13 can complete the identity recognition action on the target 2 under a normal moving state of the target 2. In other words, the target 2 needs not to stop moving to wait for recognition, thus the smoothness of mobility of people during the operation of the system 1 can be greatly enhanced.

Figure 6D:
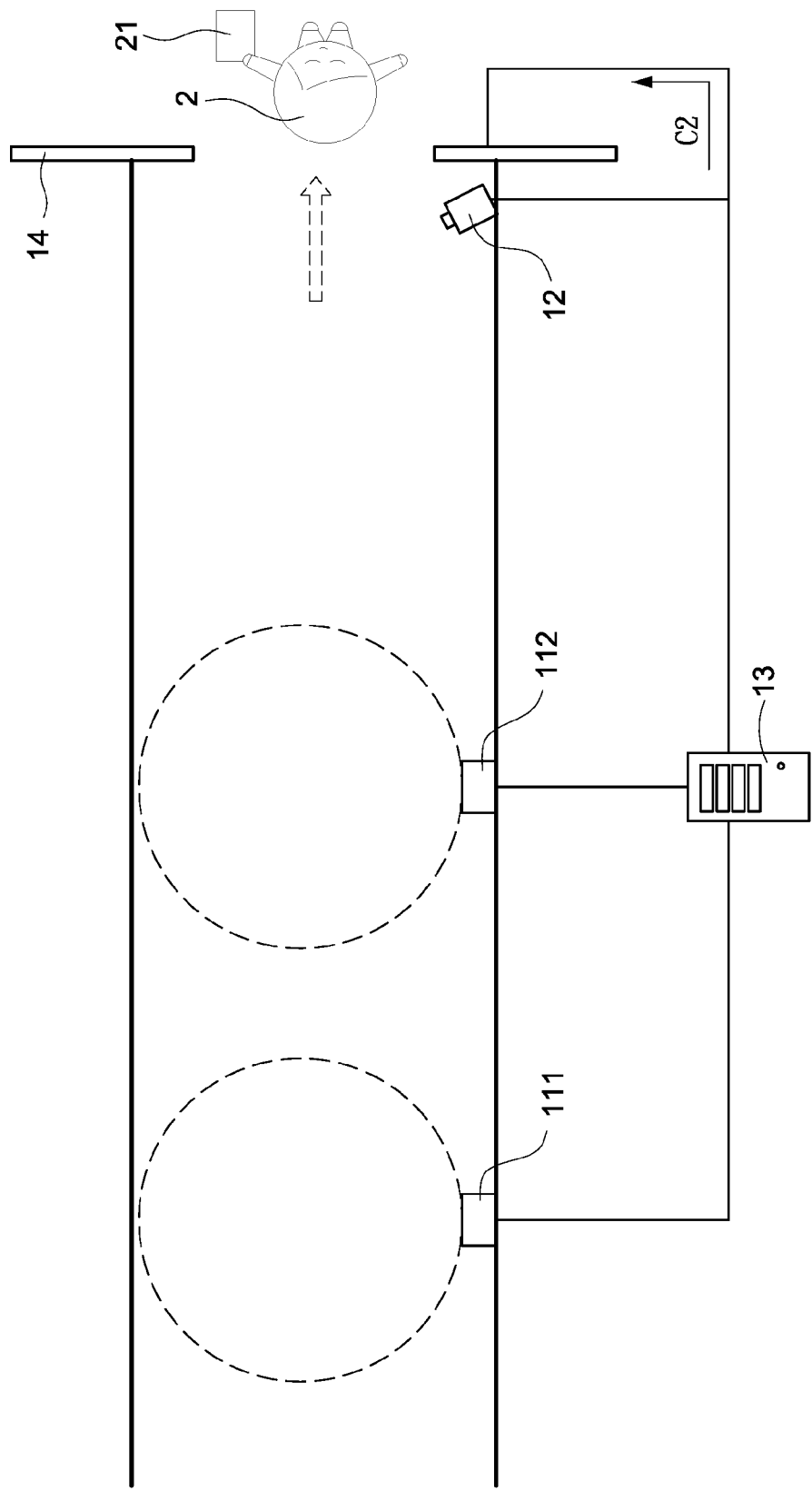
FIG. 6D is a fourth moving action schematic diagram of the first embodiment of the invention.

As shown in FIG. 6D next, when the host 13 passes through the identity recognition of the target 2, it will issue a second control command C2 to the gate 14 to control the gate 14 to open, and allowing the entering of the target 2 (such as entering the internal of the company).

On the contrary, since the gate 14 can be opened from the internal of the company, when the target 2 wants to leave the internal of the company, the system 1 will not conduct controlling to the gate 14. However, the system 1 still can record related information of leaving of the target 2 by conducting sensing to the target 2 via the two wireless signal receiving devices 11 when the target 2 is leaving. Therefore, it helps the manager to truly know the access records of the target 2.

The above mentioned are only preferred specific examples of this application, and are not thence restrictive to the scope of claims of this application. Therefore, those who apply equivalent changes incorporating contents from this application are included in the scope of this application, as stated herein.

What is claimed is:

1. A dynamic entrance controlling system (1) comprising:
   two signal receiving devices (11) respectively sensing wirelessly a wireless signal emitting device (21) at a first time point and a second time point so as to obtain ID information (ID1) of a target (2);
   an image capturing device (12) receiving a trigger to capture a real-time image information (I2) of the target (2); and
   a host (13) electrically connected to the two wireless signal receiving devices (11) and the image capturing device (12), reading a pre-stored image information (I1) of the target (2) according to the ID information (ID1) when the second time point is later than the first time point, and triggering the image capturing device (12) to capture the real-time image information (I2), and comparing the pre-stored image information (I1) with the real-time image information (I2) to conduct an identity recognition to the target (2),
   wherein, the host (13) does not conduct the identity recognition to the target (2) when the first time point is later than the second time point.

2. The dynamic entrance controlling system (1) as claim 1, wherein the two wireless signal receiving devices (11) comprise a first wireless signal receiving device (111) set away from the position of a gate (14) and sensing wirelessly the wireless signal emitting device (21) at the first time point, and a second wireless signal receiving device (112) set close to the position of the gate (14) and sensing wirelessly the wireless signal emitting device (21) at the second time point, wherein the host (13) opens the gate (14) after the identity recognition of the target (2) is success.

3. The dynamic entrance controlling system (1) as claim 2, wherein the host (13) determines a moving direction of the target (2) as entering the gate (14) when the second time point is later than the first time point, and determines the moving direction of the target (2) as exiting the gate (14) when the first time point is later than the second time point.

4. The dynamic entrance controlling system (1) as claim 1, wherein sensing ranges of the two wireless signal receiving devices (11) are not overlapped.

5. The dynamic entrance controlling system (1) as claim 1, wherein the two wireless signal receiving devices (11) sense wirelessly the wireless signal emitting device (21) by one of the wireless communication techniques: Wireless Fidelity (Wi-Fi), Worldwide Interoperability for Microwave Access (WiMAX), Bluetooth, Near Field Communication (NFC), High Performance Radio Metropolitan Area Network (HiperMAN), Infrared (IR), Zigbee, Radio Frequency (RF), Wireless Universal Serial Bus (Wireless USB), or Ultra-wideband (UWB).

6. The dynamic entrance controlling system (1) as claim 1, wherein the wireless signal emitting device (21) is an employee's card with wireless communication function or a built-in passive wireless label on it, the ID information (ID1) is a name of the target (2), a staff serial numbers of the target (2), or a social security number of the target (2).

7. The dynamic entrance controlling system (1) as claim 1, wherein the host (13) comprises:
   an image storage unit (134) storing the pre-stored image information (I1) of the target (2);
   an image capturing unit (131) reading the corresponding pre-stored image information (I1) from the image storage unit (134) according to the ID information (ID1); and
   a facial comparison unit (132) conducting the identity recognition to the target (2) according to the pre-stored image information (I1) and the real-time image information (I2).

8. The dynamic entrance controlling system (1) as claim 7, wherein the host (13) further comprises an attendance entrance unit (133) configured to open a gate (14) after the identity recognition of the target (2) is success, and to record the ID information (ID1), the first time point, the second time point, a moving direction of the target (2), and a result of the identity recognition of the target (2).

9. A dynamic entrance controlling method, comprising:
   a) sensing wirelessly a wireless signal emitting device (21) at a first time point by a first wireless signal receiving device (111) to obtain an ID information (ID1) of a target (2);
   b) sensing the wireless signal emitting device (21) at a second time point by a second wireless signal receiving device (112) to obtain the ID information (ID1) of the target (2),
   wherein one of the first wireless signal receiving device (111) and the second wireless signal receiving device (112) is set away from a position of a gate (4), and the other is set close to the position of the gate (14), and a moving direction of the target (2) is determined by comparing time order of the first time point and the second time point;
   c) reading a pre-stored image information (I1) of the target (2) according to the ID information (ID1) when a host (13) determining the second time point later than the first time point;
   d) triggering an image capturing device (12) to capture a real-time image information (I2) of the target (2) when the host (13) determining the second time point later than the first time point;
   e) comparing the pre-stored image information (I1) and the real-time image information (I2) to conduct identity recognition to the target (2); and
   wherein, the host (13) does not conduct the identity recognition to the target (2) when the first time point is later than the second time point.

10. The dynamic entrance controlling method as claim 9, wherein the first wireless signal receiving device (111) is set away from the position of the gate (14), the second wireless signal receiving device (112) is set close to the position of the gate (14), and the dynamic entrance controlling method further comprises a step f: opening the gate (14) after the identity recognition of the target (2) conducted by the host (13) is success.

11. The dynamic entrance controlling method as claim 10, wherein the dynamic entrance controlling method further comprises a step g: recording the ID information (ID1), the first time point, the second time point, the moving direction of the target (2), and a result of the identity recognition of the target (2), wherein the moving direction of the target (2) is entering the gate (14) when the second time point is later than the first time point.

12. The dynamic entrance controlling method as claim 10, wherein the dynamic entrance controlling method further comprises a step h: recording the ID information (ID1), the first time point, the second time point, and the moving direction of the target (2) when the host (13) determines the second time point is later than the first time point, wherein the moving direction of the target (2) is exiting the gate.

13. The dynamic entrance controlling method as claim 10, wherein the dynamic entrance controlling method further comprises:
   a1) after the step a), waiting for the second wireless signal receiving device (112) sensing wirelessly the wireless signal emitting device (21);
   a2) determining if the waiting is over time; and
   a3) clearing temporary data of the first wireless signal receiving device (111) after the waiting is over time.

14. The dynamic entrance controlling system (1) as claim 1, wherein one of the two wireless signal receiving devices (11) is set away from a position of a gate (14), and the other is set close to the position of the gate (14), and a moving direction of the target (2) is determined at the host (13) by comparing time order of the first time point and the second time point.

15. A dynamic entrance controlling system (1) comprising:
   two signal receiving devices (11) respectively sensing wirelessly a wireless signal emitting device (21) at a first time point and a second time point so as to obtain ID information (ID1) of a target (2), wherein the ID information (ID1) is recorded in the wireless signal emitting device (21) and is related directly to the target (2);
   an image capturing device (12) receiving a trigger to capture a real-time image information (I2) of the target (2); and
   a host (13) electrically connected to the two wireless signal receiving devices (11) and the image capturing device (12), deciding to execute an identity recognition to the target (2) when determining the second time point is later than the first time point, wherein the identity recognition comprises reading a pre-stored image information (I1) of the target (2) according to the ID information (ID1), triggering the image capturing device to capture the real-time image information (I2), and comparing the pre-stored image information (I1) with the real-time image information (I2) to conduct an one to one identity recognition to the target (2);

wherein, the host (13) does not conduct the identity recognition to the target (2) when the first time point is later than the second time point.

16. The dynamic entrance controlling system (1) as claim 15, wherein the two wireless signal receiving devices (11) comprise a first wireless signal receiving device (111) set away from the position of a gate (14) and sensing wirelessly the wireless signal emitting device (21) at the first time point, and a second wireless signal receiving device (112) set close to the position of the gate (14) and sensing wirelessly the wireless signal emitting device (21) at the second time point, wherein the host (13) opens the gate (14) after the identity recognition of the target (2) is success.

17. The dynamic entrance controlling system (1) as claim 16, wherein the host (13) determines a moving direction of the target (2) as entering the gate (14) when the second time point is later than the first time point, and determines the moving direction of the target (2) as exiting the gate (14) when the first time point is later than the second time point.

18. The dynamic entrance controlling system (1) as claim 16, wherein the host (13) further comprises an attendance entrance unit (133) configured to open the gate (14) after the identity recognition of the target (2) is success, and to record the ID information (ID1), the first time point, the second time point, a moving direction of the target (2), and a result of the identity recognition of the target (2).

19. The dynamic entrance controlling system (1) as claim 15, wherein one of the two wireless signal receiving devices (11) is set away from a position of a gate (14), and the other is set close to the position of the gate (14), and a moving direction of the target (2) is determined at the host (13) by comparing time order of the first time point and the second time point.

* * * * *